Nov. 16, 1965 D. P. ROWLEY 3,218,555

SELECTIVE CALLING SYSTEM

Filed Dec. 28, 1962 2 Sheets-Sheet 1

INVENTOR.
DONALD P. ROWLEY

BY J. David Blumenfeld

ATTORNEY

SELECTIVE CALLING SYSTEM

Filed Dec. 28, 1962 2 Sheets-Sheet 2

INVENTOR
DONALD P. ROWLEY
BY J. David Blumenfeld
ATTORNEY

United States Patent Office 3,218,555

Patented Nov. 16, 1965

3,218,555
SELECTIVE CALLING SYSTEM

Donald P. Rowley, Lynchburg, Va., assignor to General Electric Company, a corporation of New York Filed Dec. 28, 1962, Ser. No. 248,037
3 Claims. (Cl. 325—64)

Figure 1:
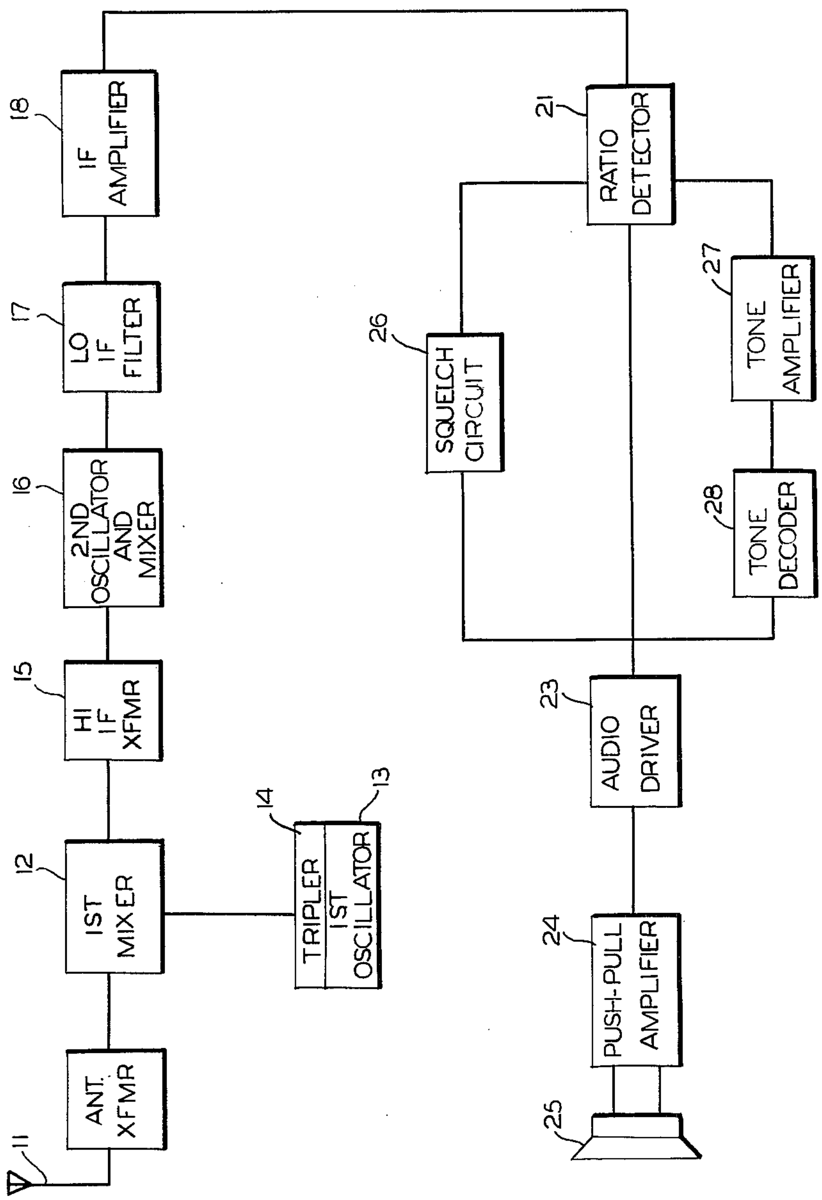

This invention relates to selective calling systems and more particularly to an improved receiver for use in a frequency-modulation communication system.

In selective calling systems such as used in the installations where a central calling station and one or more remote receiving stations are provided, it is desirable that some signal system be provided so that an operator at the central station can alert a party at a remote station that he is being called. Such systems may provide a tone signal which is selectively received and reproduced by the remote receivers to alert a subscriber that he is being called. In such systems, there is generally provided a low power output transmitter at the central station having a frequency-modulated carrier signal. The subscriber or party to be called at the remote location monitors a frequency-modulated receiver, each receiver having its own selective call circuit so that messages may be transmitted to individual receivers selectively. The selective call signal is generally a tone signal which produces a buzzing noise in the speaker of the receiver, whereupon the called party operates a manual switch to enable the receiver audio circuits.

Prior art systems provided for the above purpose have been patterned after narrow-band frequency-modulation paging systems. Such systems utilize a receiver including a resonant electro-mechanical vibratory unit which responds to a selected tone signal. The vibratory unit intermittently connects the sound reproducer or speaker of the receiver directly to a source of potential at the audible frequency rate of the calling tone so as to produce a buzzing sound in the sound reproducer, thus alerting the called party.

It has been found, however, in such arrangements where the sound reproducer or speaker of the receiver is connected directly to a source of potential, that it is often necessary to provide additional amplifying means for effective power amplification of the input signal. The use of additional amplifying means is costly and highly undesirable.

In the present invention, the disadvantages of the prior art systems are overcome and provision is made for utilizing the existing audio amplifying stages at the remote receiving stations to provide effective power amplification of the input signal.

Accordingly, it is an object of this invention to provide an improved selective calling system for communication between a central calling station and a plurality of remote receiving stations which is highly economical.

A further object of this invention is to provide an improved selective calling system for communication between a central calling station and a plurality of remote receiving stations capable of alerting a subscriber at a remotely located station in response to a call from the central station to the receiver.

Another object of this invention is to provide a receiver for an improved selective calling system capable of alerting a subscriber at a remote location in response to a call to the receiver from a central location.

In addition, it is yet another object of this invention to provide an improved selective calling system which is highly sensitive and responsive to low level signals for alerting a subscriber at a remote location in response to a call to the receiver from the central location.

With the above objects in mind, there is provided a circuit arrangement for use with a selective calling system of the type in which each receiver at one or more remote locations is maintained in a standby condition. Each receiver includes an alerting circuit which is actuated to notify a subscriber at a remote location that he is being called. The alerting circuit comprises a pair of selectively resonant electromechanical vibratory units, responsive to the tone-modulated carrier wave to intermittently bias the audio amplifier stages of the receiver at an audio rate to produce an audible alerting tone signal at the output of the receiver sound reproducer. It should be readily apparent that each receiver in the system incorporates a different pair of resonant electro-mechanical vibratory units which respond to their own predetermined tone signals to produce an audible alerting signal for the sound reproducer of the associated receiver.

Figure 2:
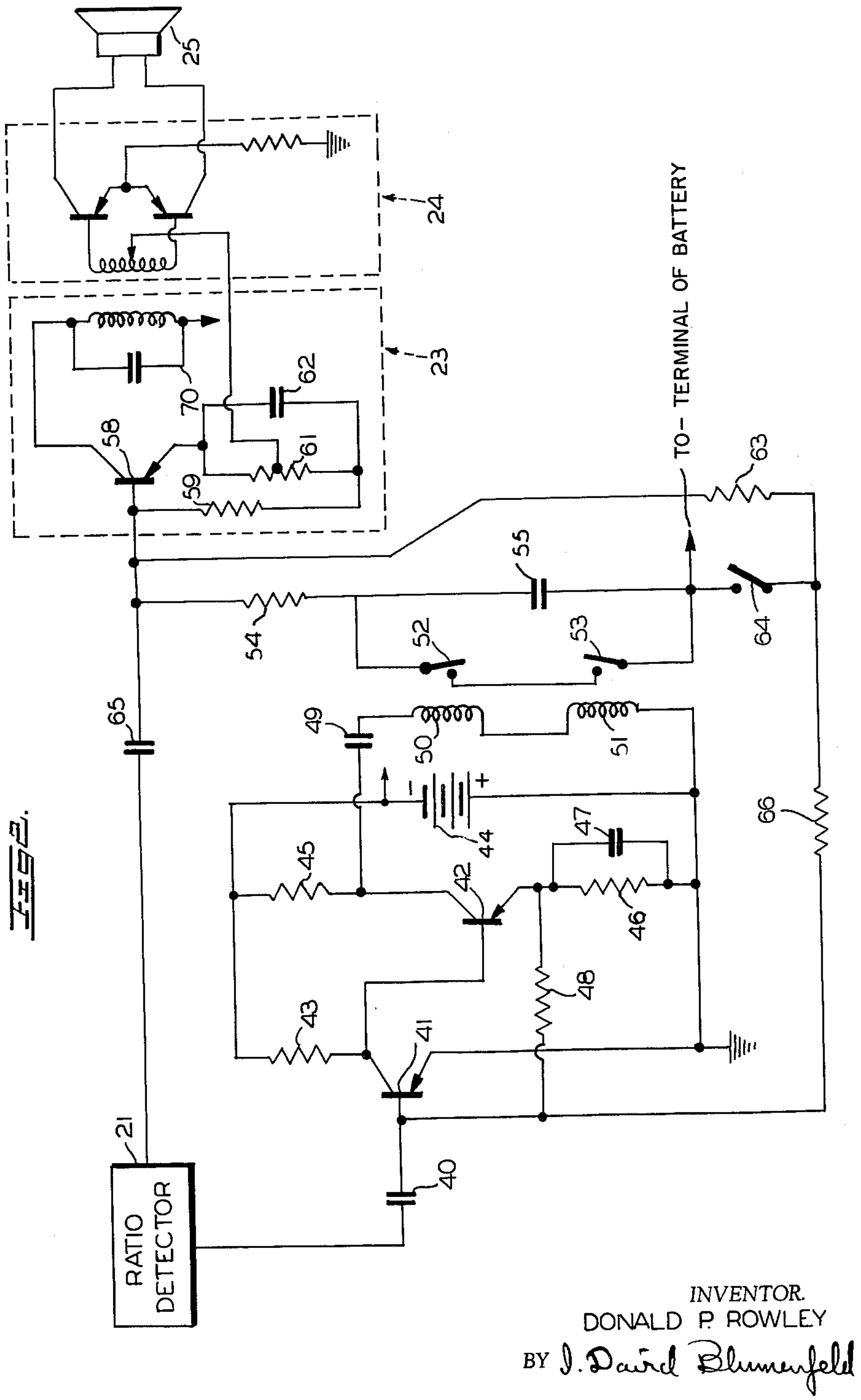

While the specification concludes with claims particularly pointing out and distinctly claiming the subject matter regarding the invention, it is believed that the invention will be better comprehended from the following description taken in connection with the accompanying drawings in which:

FIG. 1 is a block diagram representation for the receiver of the selective calling system of this invention; and FIG. 2 is a schematic representation of the tone circuit embodied in this invention.

FIG. 1 shows a frequency-modulated communications receiver for use in this invention. It can be readily appreciated that this type of receiver is particularly useful for communication between a central calling station and a plurality of remote receiving stations. In such systems, each individual subscriber is assigned to a particular receiver which in turn includes a particular tone selected call circuit adapted to respond to predetermined tone signals to produce an alerting signal at the output of the sound reproducer of the receiver. The transmitter, together with the necessary tone selector equipment, is located at a central calling station. When it is desired to transmit a message to a particular individual or subscriber, the operator at the central station, actuates a selective call circuit which causes the transmitter carrier wave to be frequency-modulated with audio intelligence signals corresponding to the message and calling tone signals of an audio frequency. The modulated carrier wave is demodulated at the receiver with the resulting tone actuating the reed switches of the electro-mechanical vibratory units resonant to the tone. The reed switches interrupt the audio amplifying stages of the selected receiver by intermittently biasing the audio amplifying stages on at an audio rate, thus producing the audible alerting signal at the sound reproducer of the selective receiver and alerting the proper individual or party that he is being called. The party then switches the receiver from the standby position to the on position, thus conditioning the receiver to receive the audio intelligence signals or transmitted message.

Referring to FIG. 1, the modulated carrier wave from the transmitter is received at antenna 11 of a typical double conversion super-heterodyne receiver and is coupled to the first converter or mixer 12 by suitable antenna coupling coils in a manner well known in the art. The coils are tuned to resonance at the incoming carrier wave frequency and provide a low input impedance to the first mixer 12 which has coupled thereto the output of first oscillator 13.

The output of the first or local oscillator 13 is coupled through frequency tripler 14 to the first mixer 12 wherein the RF signal from the antenna beats against the tripled frequency of oscillator 13 to provide a first or high IF signal. The high IF signal may be amplified in suitable first IF amplifying stages, not shown, and the amplified signal is coupled through a pair of highly selective coils of high IF transformer 15 to a second mixer stage 16 which includes a second local oscillator, also not shown. The output signal of the oscillator is mixed with the high IF signal from transformer 15 to convert it to a second or low IF signal. The low IF signal is coupled through a selective low IF filter 17 to the IF amplifier stage 18. The output of IF amplifier stage 18, which may comprise one or more IF signal amplifiers, is applied directly to a detector 21, which may typically be a ratio detector although other forms of detecting means for recovering the modulation signals, such as discriminators, may obviously be utilized.

The ratio detector 21 includes a multiple winding transformer and serves to demodulate or detect the modulating signal carried by the low IF signal and, in addition, provide a high degree of AM rejection in a manner known in the art. The detected audio intelligence and calling tone signals are taken from the tertiary winding of the ratio detector transformer and coupled through a volume control circuit (not shown) to the audio amplifier circuit. The audio amplifier circuit may include one or more stages of audio amplification and is illustrated as a two-stage amplifier comprising audio driver 23 and push-pull audio amplifier 24. The setting of the volume control determines the signal level applied to the audio driver 23, the output of which is transformer coupled to Class B push-pull amplifier 24. The output of push-pull amplifier 24 serves to drive the sound reproducer or speaker 25.

A noise squelch circuit 26 may be provided which in the absence of the transmitted carrier or signal at the receiver disables the audio amplifier circuits so that random noise is not reproduced by the speaker during these intervals. Noise squelch circuits of the type are well known and no further discussion thereof is needed. Suffice it to say that when a transmitted carrier wave is present at the receiver, a positive voltage is picked up at the ratio detector 21 and is applied to the squelch circuit 26 to disable the squelch circuit. When the squelch circuit 26 is disabled, the first audio stage, that is audio driver 23, is suitably biased to permit conduction, thus allowing the audio signal to be reproduced.

In order to alert an individual that he is being called, a tone decoder or tone selective circuit is provided. When the proper calling tone-modulated signals are fed into the receiver, the tones are detected at the ratio detector 21 and fed to a two-stage tone amplifier 27. The output of amplifier 27 is fed to a tone decoder 28, which comprises two series-connected electro-mechanical vibratory units, each selectively resonant to a predetermined calling tone signal. When the received tones are at the resonant frequency of the vibratory units, the reed switches associated with each unit intermittently open and close at an audio rate corresponding to the tones. When the tones are of the proper frequency, the reed switches close simultaneously at an audio rate, the closure establishing an electrical path from the first stage of the audio amplifier to the bias source through the contacts of the reed switches.

It should be apparent that each receiver is provided with individual electro-mechanical vibratory units, each resonant at a particular frequency.

The reed switches of each unit are serially connected to the first stage audio amplifier or driver 23. As the reed switches close simultaneously, the audio driver 23 is intermittently switched on and off at an audio rate resulting in a buzzing sound or tone which can be heard at the sound reproducer or speaker 25. The buzzing sound serves to apprise the user at the receiver that a message is about to be transmitted to him. When the tone signal is discontinued, the user actuates a switch to connect the audio stages of the receiver so that the intelligence signals or voice message can be heard.

Referring to FIG. 2, there is illustrated schematically the receiver tone amplifier and tone decoder circuit embodied in this invention and shown in block form in FIG. 1 as blocks 27 and 28 respectively. The audio driver 23 and push-pull amplifier 24 are also shown schematically within dotted blocks. The calling tone signal detected at ratio detector 21 is coupled through coupling capacitor 40 to the tone amplifier circuit comprising PNP transistors 41 and 42. The calling tone signal is coupled to the base of transistor 41 which has its collector electrode connected through resistor 43 to the negative side of a suitable bias supply or power source 44. Power source 44 may be a battery having its positive terminal grounded. The emitter electrode of transistor 41 is connected directly to the positive side of the bias source 44. The output of transistor 41 is coupled directly from its collector electrode to the base of transistor 42. Transistor 42 has its collector electrode connected to the negative side of bias source 44 through resistor 45, and its emitter electrode connected to the positive side of bias source 44 through resistor 46 and shunt capacitor 47. Feedback resistor 48, which serves to improve the temperature stability of the tone amplifier circuit, is connected between the emitter electrode of transistor 42 and base electrode of transistor 41.

The output of the second transistor 42 of the tone amplifier is coupled through capacitor 49 to two serially-connected electro-mechanical vibratory units. Each electro-mechanical vibratory unit is frequency selective and comprises operating coils 50 and 51 and corresponding vibrating reed switches 52, 53 respectively. Each vibratory unit is constructed to respond to a different selected tone frequency, and in the presence of a signal of that frequency, the corresponding reed switch vibrates making intermittent contact with an associated contact at a rate corresponding to the frequency of the actuating calling tone signal. Since each vibratory unit is selected to be frequency responsive to a different tone frequency, the intermittent operation of the associated reed switches will take place at different audio rates and a time is reached when the contacts of each reed switch will close simultaneously to complete the electrical circuit through the contacts of the reed switches 52, 53, which are serially connected. Reed switch 53 is connected to the negative side of bias source 44, while reed switch 52 is connected through bias resistor 54 to the first stage of the audio amplifier. The audio amplifier may provide one or more stages of audio amplification and is shown as a two-stage amplifier comprising audio driver 23 and push-pull amplifier 24. A capacitor 55 is connected in parallel with the contacts of the reed switches 52, 53 and serves to integrate the switching voltage to thereby improve the audio tone which can be heard at the output of the sound reproducer.

Audio driver 23 comprises a transistor 58 normally biased in the off condition through base resistor 59 connected to the positive or grounded side of energizing power source 44. The emitter electrode of transistor 58 is connected to the positive side of power source 44 through a grounded resistor 61 and shunt capacitor 62. Biasing resistor 63 is serially connected to one side of the manually operable, normally open switch 64. The other side of switch 64 is connected to the negative side of energizing power source 44. When switch 64 is in the closed position, the transistor 58 is biased on for normal operation and amplification of any audio intelligence signals translated from the detector 21 through capacitor 65. In addition, the closing of switch 64 also serves to bias transistor 41 of the tone amplifier on through base resistor 66, now connected to the negative terminal of power source 44. Conduction of transistor 41 drives the base voltage of transistor 42 in a positive direction, thus cutting off transistor 42 and preventing the operating coils 50, 51 of the vibratory units from being energized on small or spurious noise level signals. The output of audio driver 23 is coupled through collector tank circuit 70 to push-pull amplifier 24 where it is further amplified and applied to the output sound reproducer or speaker 25 in a manner known in the art.

In operation, the receivers are maintained in a standby condition and a carrier wave modulated with audio intelligence signals and calling tone signals is transmitted from a central calling station. The carrier wave is frequency-modulated by a plurality of calling tones corresponding to the selective characteristics of a plurality of frequency selective electro-mechanical vibratory units or tone decoders within a particular receiver. The received carrier wave is demodulated or detected in a ratio detector 21 to separate the audio intelligence signals or message and the calling tone signals from the modulated carrier wave. The resulting calling tone signals are in turn amplified through the transistors 41, 42 of the tone amplifier 27, the output of which energizes the serially-connected coils 50, 51 of the vibratory units at the frequency rate of the tones. Each unit is selectively resonant to a particular tone, and the energization of the coil of a particular vibratory unit causes the associated reed switch to intermittently open and close. When the calling tone signals are of the proper frequencies, the coils of vibratory units 50, 51 are energized and the associated reed switches close simultaneously at an audio frequency rate establishing a bias for the audio driver 23 through the closed reed switches 52, 53 of the vibratory units. The audio driver 23 is thus interrupted or biased on and off at this audio rate with the resultant output tone of the amplifier energizing the sound reproducer or speaker 25. This establishes a buzz or tone signal at the output of the speaker which alerts the user that a message is about to be transmitted to him. After the tone signal is terminated, the user places switch 64 in its closed or "listen" position which biases audio amplifier 23 on for normal operation and reception of the audio message from the ratio detector.

Although a particular embodiment of the subject invention has been described, many modifications may be made, and it is intended by the appended claims to cover all such modifications which fall within the true spirit and scope of the invention.

What is claimed as new and desired to be secured by Letters Patent is:

1. In a receiver for a selective calling communication system of the type utilizing a carrier wave modulated with audio intelligence signals and with calling tone signals of a predetermined audio frequency, the combination including:

(a) means for detecting the received carrier wave and for extracting the audio intelligence and the calling tone signals therefrom;
(b) normally inoperative audio amplifying means;
(c) a source of bias voltage for biasing said amplifying means into conduction, said source being normally disconnected from said amplifying means;
(d) a sound reproducer coupled to said amplifying means and arranged to be energized by the output of said amplifying means;
(e) first circuit means coupling said detector and said amplifying means to apply said audio intelligence to said amplifying means;
(f) second circuit means coupling said detector and said amplifying means including frequency responsive switching means connected between said source of bias voltage and said amplifying means, said switching means being responsive to a selected calling tone signal for closing said switching means at an audio frequency rate and intermittently connecting said biasing source to said amplifying means at said audio rate thereby biasing said amplifying means intermittently into conduction at said rate to produce an intermittent current flow at the audio rate, said intermittent current flow producing an audible calling signal at said reproducer;
(g) a manually operable switch for permanently connecting said biasing source to said amplifying means for biasing said audio amplifying means for normal operation and amplification of said audio intelligence signals so that said audio amplifying means is utilized both for generating an audible calling signal and for subsequently amplifying said audio intelligence.

2. The receiver as set forth in claim 1 wherein said second means comprises at least a pair of frequency selective electro-mechanical vibratory units, each of said units being responsive to a different predetermined individual tone frequency, and said audio amplifying means is intermittently biased at an audio rate in response to said calling tone signals thereby providing at the output of said sound reproducer an audible alerting signal.

3. In a receiver for a selective calling communication system of the type utilizing a carrier wave modulated with audio intelligence signals and with calling tone signals of a predetermined audio frequency, the combination including:

(a) means for detecting the received carrier wave and for extracting the audio intelligence and the calling tone signals therefrom;
(b) normally inoperative audio amplifying means;
(c) a source of bias voltage for biasing said amplifying means into conduction, said source being normally disconnected from said amplifying means;
(d) a sound reproducer coupled to said amplifying means and arranged to be energized by the output of said amplifying means;
(e) first circuit means coupling said detector and said amplifying means to apply said audio intelligence to said amplifying means;
(f) second circuit means including tone decoding means coupling said detecting means to said amplifying means, said tone decoding means including:
  (1) at least two frequency selective electromechanical vibratory units, each of which includes an operating coil and a corresponding reed and contact;
  (2) each of said operating coils and reeds being selectively resonant at a different predetermined audio tone frequency and arranged to be energized in response to said calling tone signals;
  (3) each of said reed switches being responsive to the energization of its corresponding operating coil and adapted to close a contact when energized at the tone frequency rates to which it is resonant;
  (4) said reed switches, when energized, being arranged to intermittently connect said biasing source to said amplifying means at an audio frequency rate and intermittently bias said amplifying means into conduction at said audio rate to produce an intermittent current flow at said audio rate, said intermittent current flow producing an audible calling signal at said reproducer;

(g) and a manually operable switch for permanently connecting said bias source to said amplifying means for biasing said audio amplifying means for normal operation and amplification of said audio intelligence signal from said detector means whereby said audio amplifying means is utilized both for generating an audible calling signal and subsequently amplifying the audio intelligence.

References Cited by the Examiner

UNITED STATES PATENTS

| | | | |
|---|---|---|---|
| 2,485,580 | 10/1949 | Ferrar et al. | 179—87 |
| 2,523,315 | 9/1950 | Mayle | 325—392 |
| 2,547,024 | 4/1951 | Noble | 325—55 |
| 2,579,470 | 12/1951 | Brown | 325—55 |
| 2,941,161 | 6/1960 | Scantlin | 343—228 |
| 2,980,794 | 4/1961 | Hargreaves et al. | 325—64 |
| 3,040,256 | 6/1962 | Bostwick et al. | 343—228 |
| 3,090,013 | 5/1963 | Scantlin et al. | 325—64 |
| 3,138,755 | 6/1964 | Kompelien | 325—55 X |

DAVID G. REDINBAUGH, *Primary Examiner.*